US009797182B2

(12) United States Patent
Raap et al.

(10) Patent No.: US 9,797,182 B2
(45) Date of Patent: Oct. 24, 2017

(54) POWERED WINDOW SYSTEM

(71) Applicant: Amesbury Group, Inc., Amesbury, MA (US)

(72) Inventors: Dan Raap, Hartford, SD (US); Bruce Hagemeyer, Pella, IA (US); Gary E. Tagtow, Sioux Falls, SD (US); Michael Martin May, Stillwater, MN (US); James Gerard Seaser, Owatonna, MN (US)

(73) Assignee: Amesbury Group, Inc., Amesbury, MA (US)

( * ) Notice: Subject to any disclaimer, the term of this patent is extended or adjusted under 35 U.S.C. 154(b) by 0 days.

(21) Appl. No.: 14/823,896

(22) Filed: Aug. 11, 2015

(65) Prior Publication Data

US 2016/0047158 A1 Feb. 18, 2016

Related U.S. Application Data

(60) Provisional application No. 62/036,481, filed on Aug. 12, 2014.

(51) Int. Cl.

| | |
|---|---|
| ***B60J 1/16*** | (2006.01) |
| ***E05F 15/70*** | (2015.01) |
| ***E05F 15/665*** | (2015.01) |
| ***E06B 3/44*** | (2006.01) |

(52) U.S. Cl.
CPC ............ *E05F 15/70* (2015.01); *E05F 15/665* (2015.01); *E06B 3/44* (2013.01); *E06B 3/4415* (2013.01); *E05Y 2900/148* (2013.01)

(58) Field of Classification Search
CPC ...... E05F 15/70; E05F 15/665; E06B 3/4415; E05Y 2900/148
USPC ..... 49/360, 374, 378, 324, 331, 332, 98, 99, 49/100, 102, 116, 123, 61, 63, 65, 142
See application file for complete search history.

(56) References Cited

U.S. PATENT DOCUMENTS

| | | | | | |
|---|---|---|---|---|---|
| 645,939 | A | * | 3/1900 | Cayce | 49/99 |
| 761,733 | A | * | 6/1904 | Wahlstrom | 160/37 |
| 1,238,704 | A | * | 8/1917 | Wedlelken | 49/125 |
| 1,781,304 | A | * | 11/1930 | Shook | 49/64 |
| 1,963,839 | A | * | 6/1934 | Edwards | E06B 3/44 49/374 |
| 2,187,561 | A | * | 1/1940 | Sampson | 49/463 |
| 2,576,888 | A | * | 11/1951 | Padgett | 40/381 |
| 2,989,304 | A | * | 6/1961 | Ulmann | 49/220 |
| 3,992,751 | A | * | 11/1976 | Foster et al. | 16/197 |
| 4,083,149 | A | * | 4/1978 | Hickman et al. | 49/147 |

(Continued)

FOREIGN PATENT DOCUMENTS

| | | | | |
|---|---|---|---|---|
| CA | 1267661 | A | * | 4/1990 |
| CA | 2081842 | | * | 5/1994 |
| FR | 2968344 | A1 | * | 6/2012 |

*Primary Examiner* — Jerry Redman

(57) ABSTRACT

A window frame has a sash and a panel that is disposed parallel to the sash, both of which are slidably disposed in the frame. A receiver is fixed at a first end of the frame. When the sash is in a first position, the sash is disposed within the receiver. When the sash is in a second position, the sash is disposed outside the receiver. A motor is fixed relative to the frame with a drive system connecting the motor to the sash or the panel. A control input is connected to the motor and is configured to receive a signal from a controller, a sensor, or a building management system.

18 Claims, 12 Drawing Sheets

(56) References Cited

U.S. PATENT DOCUMENTS

| | | | | |
|---|---|---|---|---|
| 5,119,591 | A * | 6/1992 | Sterner et al. | 49/162 |
| 5,379,824 | A * | 1/1995 | Carvalho | 160/90 |
| 5,595,026 | A * | 1/1997 | Licking et al. | 49/360 |
| 5,636,579 | A * | 6/1997 | Shelley | 109/11 |
| 5,860,371 | A * | 1/1999 | Shelley | 109/11 |
| 5,906,070 | A * | 5/1999 | Boerhave | 49/207 |
| 9,038,317 | B2 * | 5/2015 | Hansen | E05F 15/665<br>49/360 |
| 2003/0024167 | A1 * | 2/2003 | Cheng | E06B 3/4423<br>49/374 |
| 2005/0229494 | A1 * | 10/2005 | Harari | E05D 15/0669<br>49/360 |
| 2014/0150346 | A1 * | 6/2014 | DeBoer | 49/414 |

* cited by examiner

POWERED WINDOW SYSTEM

CROSS-REFERENCE TO RELATED APPLICATIONS

This application claims priority to and the benefit of U.S. Provisional Pat. Application No. 62/036,481, filed Aug. 12, 2014, the disclosure of which is hereby incorporated by reference herein in its entirety.

INTRODUCTION

Powered windows have not yet been widely accepted in the marketplace. The reasons are numerous, but may include product expense, consumer mistrust of the safety and/or security of the technology, or other reasons. Many consumers view windows as a building material that is simply opened or closed when needed and, in the interim, largely forgotten, since the window performs little function other than ventilation. Additionally, many automated windows neither control nor adequately address energy, security, performance, and/or impact resistance automatically, without constant user input.

SUMMARY

In one aspect, the technology relates to: a window unit having: a frame; a sash slidably disposed in the frame; a panel slidably disposed in the frame, wherein the panel is disposed parallel to the sash; a receiver fixed at a first end of the frame, wherein when the sash is in a first position, the sash is disposed substantially within the receiver, and wherein when the sash is in a second position, the sash is disposed substantially outside the receiver; a motor fixed relative to the frame; a drive system connecting the motor to at least one of the sash and the panel; and a control input connected to the motor, wherein the control input is configured to receive a signal from at least one of a controller, a sensor, and a building management system. In an embodiment, the drive system includes a pulley and at least one of a chain and a cable. In another embodiment, at least one of the chain and the cable includes a first end, a second end, and a central portion, wherein the first end is connected to the sash proximate an upper portion of the sash, and wherein the second end is connected to the sash proximate a lower portion of the sash, and wherein the central portion is disposed about the pulley. In yet another embodiment, the motor includes a sash motor and wherein the drive system includes a sash drive system, wherein the sash motor and the sash drive system are configured to move the sash between the first position and the second position. In still another embodiment, the motor includes a panel motor and wherein the drive system includes a panel drive system, wherein the panel motor and the panel drive system are configured to move the panel.

In another embodiment of the above aspect, the controller is mounted to the window unit, wherein the window unit has an output connected to the control input. In an embodiment, the control unit is connected to at least one of a building power source, a battery, and a solar panel. In another embodiment, the solar panel is disposed on an exterior panel secured to the frame. In yet another embodiment, the exterior panel at least partially defines the receiver. In still another embodiment the solar panel, wherein the solar panel is disposed the panel.

In another embodiment of the above aspect, the panel includes at least one of a solar panel, a security panel, a screen, a mesh, a louver, and a reflective panel. In an embodiment, the motor is disposed in a motor compartment disposed at a second end of the frame, opposite the first end of the frame. In another embodiment, the motor is disposed in the receiver. In yet another embodiment, the sash is biased into the first position.

BRIEF DESCRIPTION OF THE DRAWINGS

There are shown in the drawings, examples which are presently preferred, it being understood, however, that the technology is not limited to the precise arrangements and instrumentalities shown.

DETAILED DESCRIPTION

Figure 1:
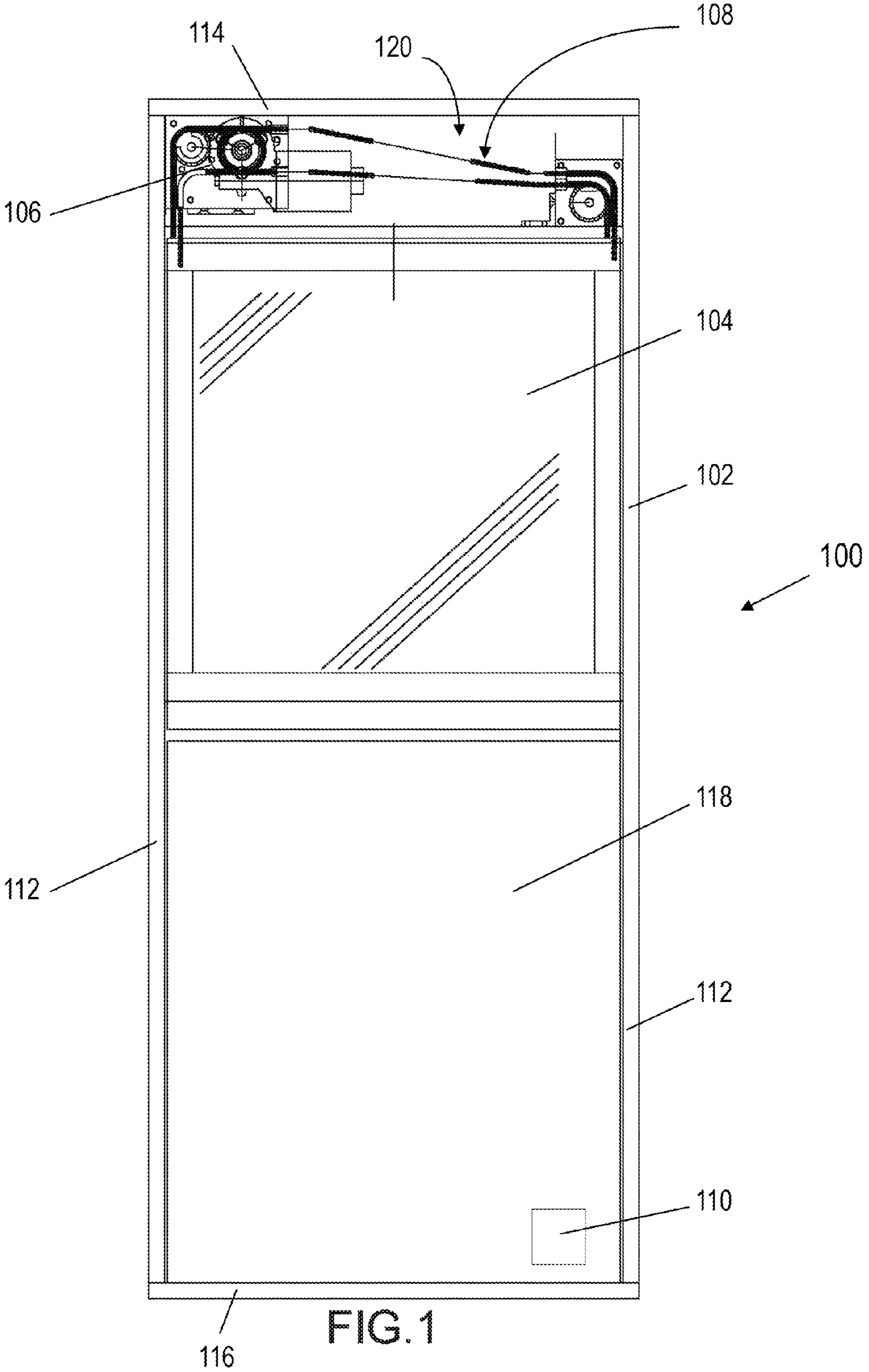
FIG. 1 is a partial cut away front view of a powered window unit.

The technologies described herein are directed to a powered window system or unit that is intended for schools, health care, hotels, light commercial, residential, and other energy-conscious facilities. In addition to high air resistance, water resistance, and structural performance, examples of such window systems manage any or all of security, ventilation, energy savings, energy generation, and may meet American with Disabilities Act (ADA) requirements.

The powered window systems may be installed in a vertically- or horizontally-operating orientation. High performance insulated glass may be installed in the window sash. Examples of the window system may include a movable panel that covers and uncovers the window sash opening. The panel may provide insulation, improve security, and increase storm and/or impact resistance, among other functions. In addition, the panel can include a solar panel, decorative panel, screen, etc. Multiple panels can be utilized. Other accessories (such as ventilators) may be added to interior or exterior insulated panels. Ventilators may be used to exchange indoor and outdoor air at each discrete window unit, for ventilation, free cooling, etc. Additionally, warm air that may be present within the window unit itself due to solar heat gain could be vented to optimize energy usage and comfort within the building. Additionally, an insect-resistant screen may be unrolled automatically as either or both of the window sash or panel is opened, to prevent intrusion of insects.

Both the window sash and the panel cover may be operated by electric motor drive systems or mechanical drive systems to slide those elements remotely and independently. The motor, control components, sensor, and so on may be powered by a dedicated (e.g., battery) power system, building power system, and/or one or more solar cells. The solar cells may be integrated into an exterior portion of the window to maintain and charge the power system battery if present, or deliver electrical power back to the building power grid. The window system manages and conserves energy, and provides impact resistance, privacy, and security for the building, even when the sash is open. In certain examples, the window system may be controlled remotely. The movable window sash and panel may operate separately or together. An energy and/or security management system may control the window with little or no energy consumption. This window system may rely on sensors and a CPU to operate the window, communicate status, etc. The sash and panel may be controlled by an energy and security management system that may be integrated and powered with solar cells, building power, or otherwise. In various examples, this management system may open and close the window sash, open and close the panel, and/or manage the energy collection/distribution system.

The window system includes a frame that holds the window sash and the panel. The frame also contains electric motor drive systems or mechanical drive systems. One drive system may power the window sash to open and close the window for ventilation. Another drive system may power the panel to protect and/or insulate the window. In another example, a single drive system with a clutch mechanism may be used to actuate the window sash and panel. Additional drive systems or actuators may be used for other window functions if required or desired. The window frame also provides weatherstripping to control air flow and water control to prevent water from penetrating the structure in which the window is mounted. In addition, the window frame also provides insulation across the overall frame to insulate the window system.

With these broad concepts in mind, several examples of powered window systems are described below. For example, FIG. 1 is a partial cut away front view of a powered window unit 100. The window unit 100 may include a window frame 102, a movable window sash 104, a movable panel (not depicted), a drive motor 106, a drive system (depicted generally as 108), and a controller/management system 110. As described above, the drive motor 106 and drive system 108 can be a combined system that operates both the sash and the panel. Examples thereof are described below. The various elements are contained within the single window unit 100 to be installed within a building envelope. In general, the window system 100 of FIG. 1 is depicted in a vertical orientation, but may also be installed in a horizontal orientation so as to slide side-to-side. Further structure, functionality, and aspects of these and other components are described below.

The window frame 102 includes weather-resistant structural members joined in a manner to hold the other components. The frame 102 is secured to the building structure to provide a weather-resistant seal, typically at one or more side jambs 112, a head 114, and a sill 116. Weatherstripping and insulation may also be incorporated into the frame 102. FIG. 1 depicts a view of the window 100 from an interior side, and may include an interior panel 118 proximate the sill 116. In this example, the panel 118 is insulated and includes the window management system 110, or may also include one or more basic control elements (e.g., an up/down switch). Different types of control elements are described below and are positioned so as to be more easily accessible to a user. Disposing the control elements lower on the window 100 may enable them to be more easily actuated by a person with disabilities, in compliance with the American with Disabilities Act. Additionally, the interior panel 118 may be decorative or may be designed to be visually and structurally similar to the wall in which the window system 100 is installed. A service panel (removed in FIG. 1 for clarity) can enclose the motor 106 and drive system 108. The interior panel 118 and/or service panel may be removed to access interior cavities of the window system 100, as well as any mechanism, electronics, motors, and other elements disposed therein, for service and replacement.

The sash 104 is generally installed on an interior (relative to the movable panel) of the window unit. This interior-mounted sash 104 may be an insulated glass assembly. The glass assembly may be of various thicknesses and may incorporate various high performance enhancements like glass coatings, gases between the panes of glass, and/or vacuum insulated glass. Coatings may be those available in the art, including but not limited to colored, electrochromatic, and reflective. In certain examples, the sash 104 may be substantially frameless, or the frame of the sash 104 may be hidden within the window frame 102. The sash 104 slides up and down or side-to-side in the frame 102 (depending on the installation orientation) and may be sealed with weatherstripping. The sash 104 may be attached to a sash drive system (e.g., the drive system 108) disposed within a drive cavity 120 of the window frame 102. The drive system 108 may be connected to the sash 104 within the side jambs 112 so as to be hidden from view during use. In certain examples, it may be desirable that the window sash 102 is not movable, e.g., in high-rise building applications where opening windows may be undesirable. The window system 100 may still perform other functionality as described herein, even though the sash 104 is not movable.

Figure 2A:
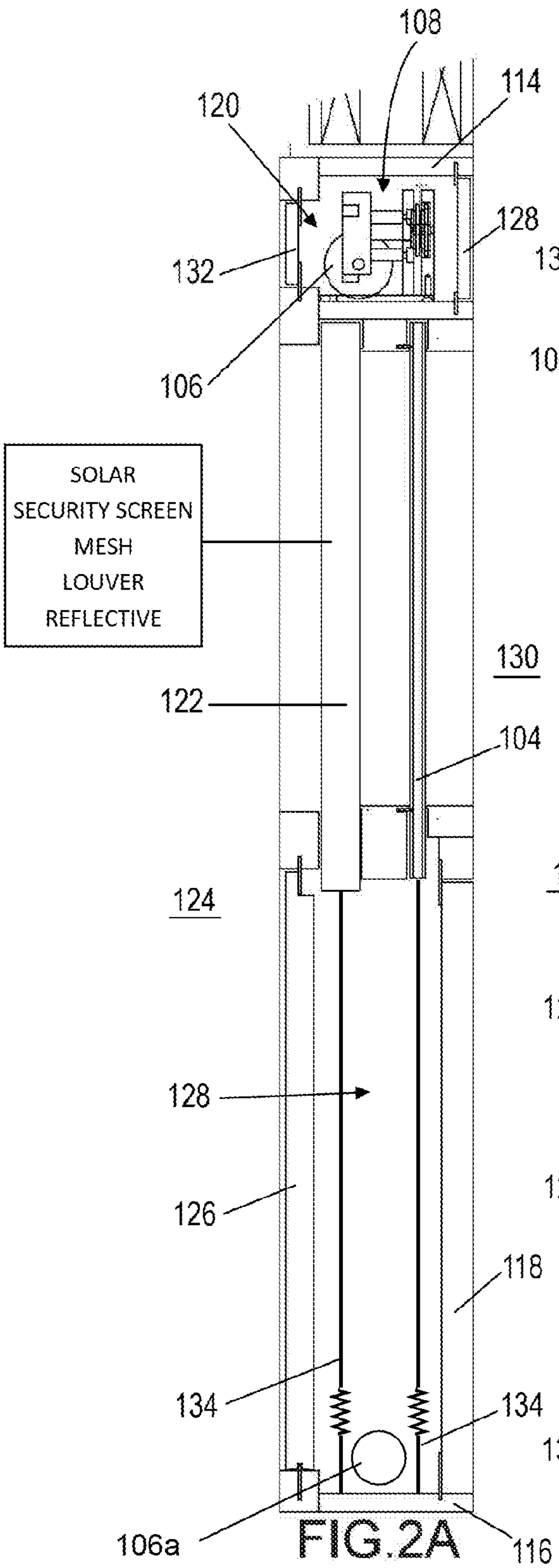
FIGS. 2A and 2B are side sectional views of the powered window unit of FIG. 1, with the sash and panel in upper closed positions and lower open positions, respectively.
Figure 2B:
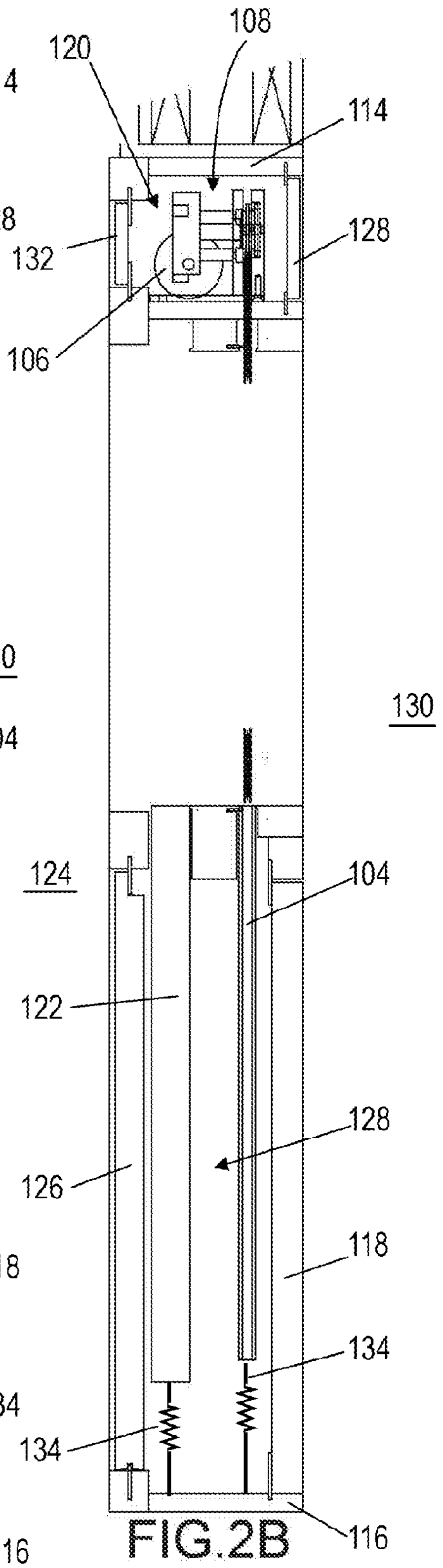

FIGS. 2A and 2B are side sectional views of the powered window unit 100 of FIG. 1, with the sash 104 and the panel 122 in upper closed positions and lower open positions, respectively. A number of elements depicted in FIGS. 2A and 2B are described above in the context of FIG. 1 and thus are not necessarily described further. FIGS. 2A and 2B are described simultaneously. The panel 122 may be made of an insulated material with structural impact resistance, which may be configured to withstand, e.g., hurricane-force winds or projectiles such as bullets, bricks, or other damaging implements. The panel 122 may be manufactured of a composite material such as Kevlar or other robust protective plastic. Additionally, the panel 122 may be manufactured of metal, which may be selected or otherwise treated to resist environmental conditions such as salt-spray, ultraviolet rays, wind, etc. The panel 122 is configured to slide in the frame 102 on the exterior side 124 of the window unit 100 in front of the movable sash 104. The panel 122 may be moved by the motor 106 and drive system 108 (a clutch or other disengageable element may be utilized to separate movement of the panel 122 from movement of the sash 104). In an alternative example, the panel 122 may utilize its own dedicated motor and drive system. Such examples are depicted below. The panel drive system (if used) may also be disposed in the drive cavity 120. The panel 122 may be manufactured of several materials, glass, or solar panels. Additionally, the panel 122 may be a decorative and/or functional (e.g., bug-resistant) screen material. The panel 122 may also be a steel or other metal security mesh or bar structure to prevent unwanted ingress by an intruder. Multiple parallel panels may be utilized. For example, an outer decorative or architectural panel may be utilized in conjunction with an inner protective panel.

An exterior panel 126 may incorporate a solar panel and/or may be configured to resemble the exterior structure of the building in which the window system 100 is installed. As with the interior panel 118, this panel may also be insulated. In examples, this panel 126 may be removeable, but for security purposes, it may be desirable that only the interior panel 118 is removeable. The interior panel 118, exterior panel 126, sill 116, and side jambs 112 at least partially define a receiver 128. The receiver 128 is configured to receive both the panel 122 and the sash 104 when these components are in the open position. In another example, a motor 106*a* may be disposed in the receiver 128. In examples, substantially all of the panel 122 and sash 104 may be received in the receiver 128 when in the open position. When in the closed position, a lower portion of either or both of the panel 122 and the sash 104 may still be disposed in the receiver 128 to maintain stability of those elements. The drive cavity 120 may be access via an access panel 128 on an interior side 130 of the window unit 100. An exterior drive cavity panel 132 may be finished to match the exterior aesthetics of the building, include a solar panel, etc. A spring, balance, or other biasing element 134 may be connected to either or both of the sash 104 and the panel 122. In the event of a power failure, drive system failure, or other condition, a user may activate a mechanical release that disengages the drive system 108 from the motor 106. The biasing element 134 would then force either or both of the sash 104 and panel 122 into the open position to allow for egress. In other examples, the weight of the sash 104 and panel 122 may be sufficient to lower those elements by gravity once released. The mechanical release may be desirable so a more routine power loss (e.g., due to a storm power outage) will not open the sash 104 and panel 122, thus maintaining security of the building. A spring balance may also be used to minimize the amount of energy required by the motor to raise or lower either the sash 104 or the panel 122.

Figure 3A:
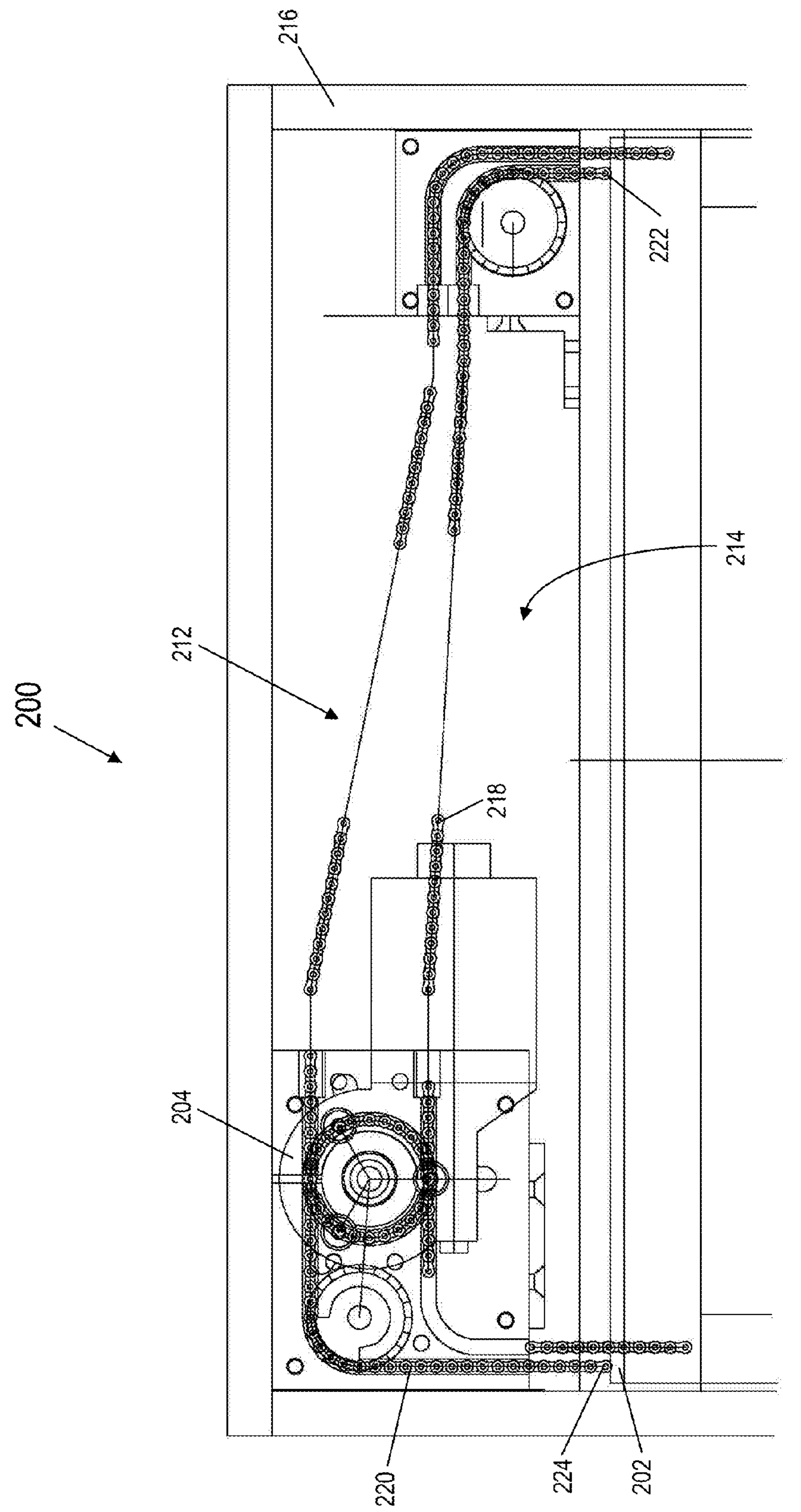
FIGS. 3A and 3B are front and top views, respectively, of a motor system of the powered window unit of FIG. 1.
Figure 3B:
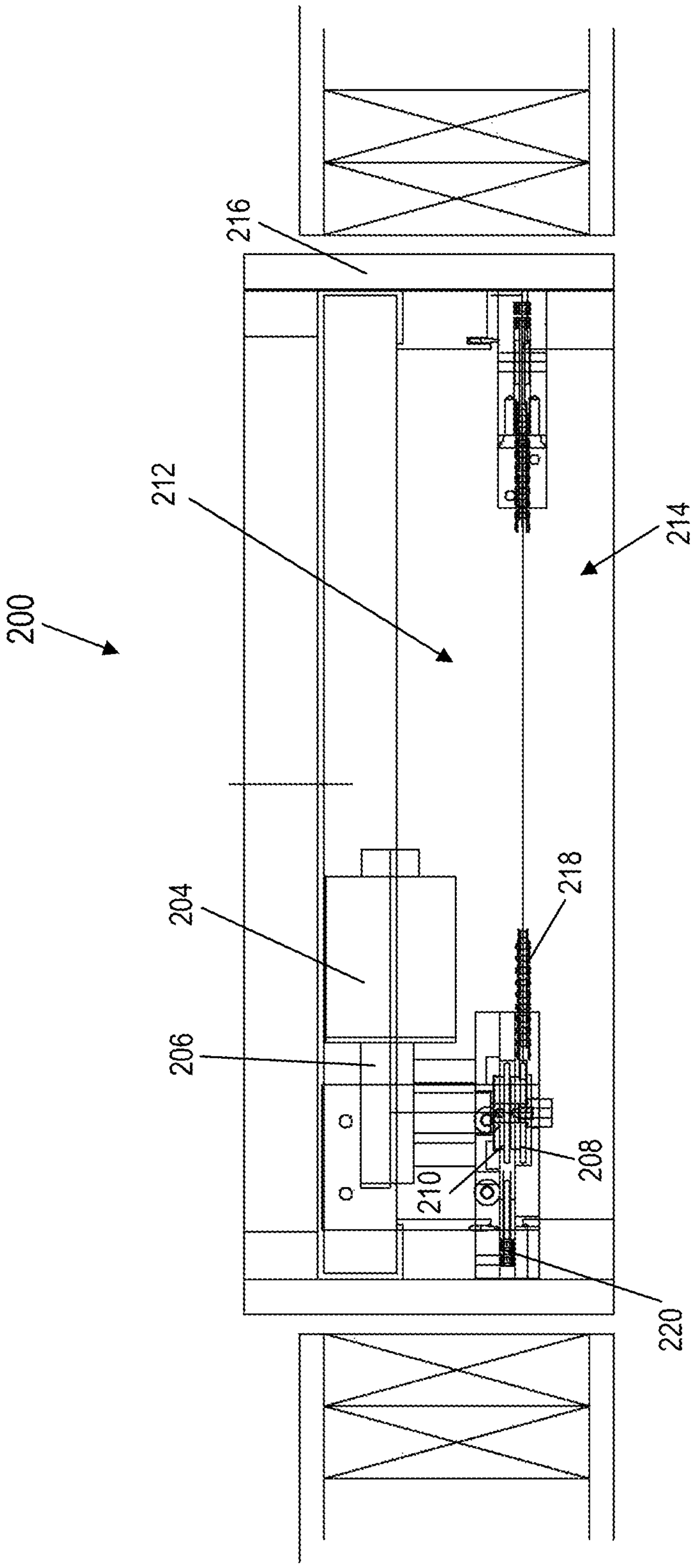

FIGS. 3A and 3B are front and top views, respectively, of a motor system 200 of the powered window unit of FIG. 1. FIGS. 3A and 3B are described simultaneously. The motor system 200 is described in FIGS. 3A and 3B in the context of a sash 202, but similar motor systems can be used to move the panel. Additional motor system configurations are depicted below in FIGS. 4A-4E. In FIGS. 3A and 3B, a single motor 204 is depicted. The motor 204 turns a shaft 206 that can include a number of gears. The motor 204 is powered and controlled by, e.g., a 12 to 24V DC electrical current from a window management system or controller (described below). A sprocket system including two sprockets 208, 210 are rotated based on rotation of the motor shaft 206. The sprocket system forms a part of the drive system (depicted generally as 212). The drive system 212 may be mounted in a drive cavity 214 of the frame 216 to move the sash 202 up and down. In the depicted embodiment, the drive system 212 may be installed behind an upper interior panel that may be removed so as to access and service the drive system 212. The drive system 212 may include a system of belts, chains, cables, or other elements which are attached to the movable sash 202 (at connectors 222, 224) through a system of pulleys, sprockets, guides, cables, etc. In the depicted example, chains 218, 220 are utilized.

The drive system 212 may include an emergency egress button or switch (not shown in FIGS. 3A, 3B). When actuated, the drive system 212 may automatically open the window sash 202 (and panel, if required) so as to allow egress through the window during an emergency. The egress system may be electrically or mechanically operated. If electrically operated, it may be desirable to include a local battery to ensure that the egress system is operational in the event of a loss of building power. A mechanical egress system may disengage the window sash 202 from the drive system 212, causing the sash 202 to fall from the closed position. In other examples, the egress system may be actuated by sensing a force applied substantially orthogonal to the sash 202 (i.e., by a panic press or strike against the interior of the window). Such sensors and accessories are described in more detail below. A panel drive system is similar to the sash drive system 202 and may include a similar emergency egress system. In another embodiment, the sash and panel drive systems may be the combined into a single system. Other drive systems are depicted in FIGS. 4A-4E, below.

Figure 4A:
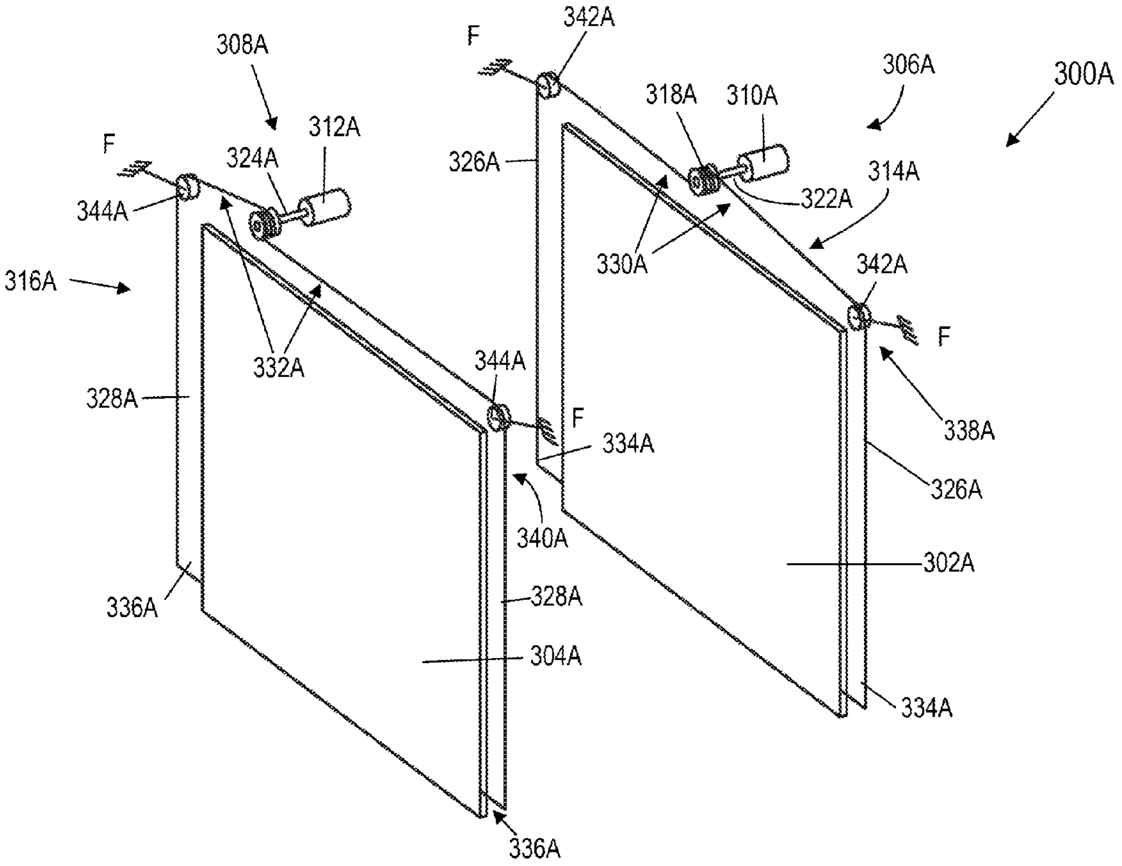
FIGS. 4A-4E are schematic diagrams of motor systems for powered window units.

FIGS. 4A-4E are schematic diagrams of window unit actuation systems 300 for powered window units. In each figure, the sash and/or panel is depicted in the closed position. In FIG. 4A, two discrete actuation systems are depicted. As used herein, the actuation system includes one or more motors and drive systems. In the depicted example, a sash 302A and a panel 304A are depicted. Each of the sash 302A and panel 304A are actuated by a dedicated actuation system 306A, 308A, respectively. Both actuation systems 306A, 308A include a motor 310A, 312A, and a drive system 314A, 316A. The actuation systems 306A, 308A are substantially identical in configuration, although larger motors and/or more robust drive systems can be used if the weight of the moved sash 302A or panel 304A warrants. Each drive system 314A, 316A includes a pulley 318A, 320A connected to a motor shaft 322A, 324A. Although one pulley 318A, 320A is depicted, two pulleys may also be used. Cables 326A, 328A are connected at first ends 330A, 332A to the pulley 318A, 320A. At second ends 334A, 336A, the cables 326A, 328A are connected to a lower portion of the sash 302A or panel 304A, respectively. Central portions 338A, 340A of the cables 326A, 328A are routed about pulleys 342A, 344A so as to reduce friction. The pulleys 342A, 344A are generally fixed in position, for example, to the window unit frame F. This particular configuration allows for optimum sizing of the motors (as required for the weight of the sash 302A and the panel 304A).

Figure 4B:
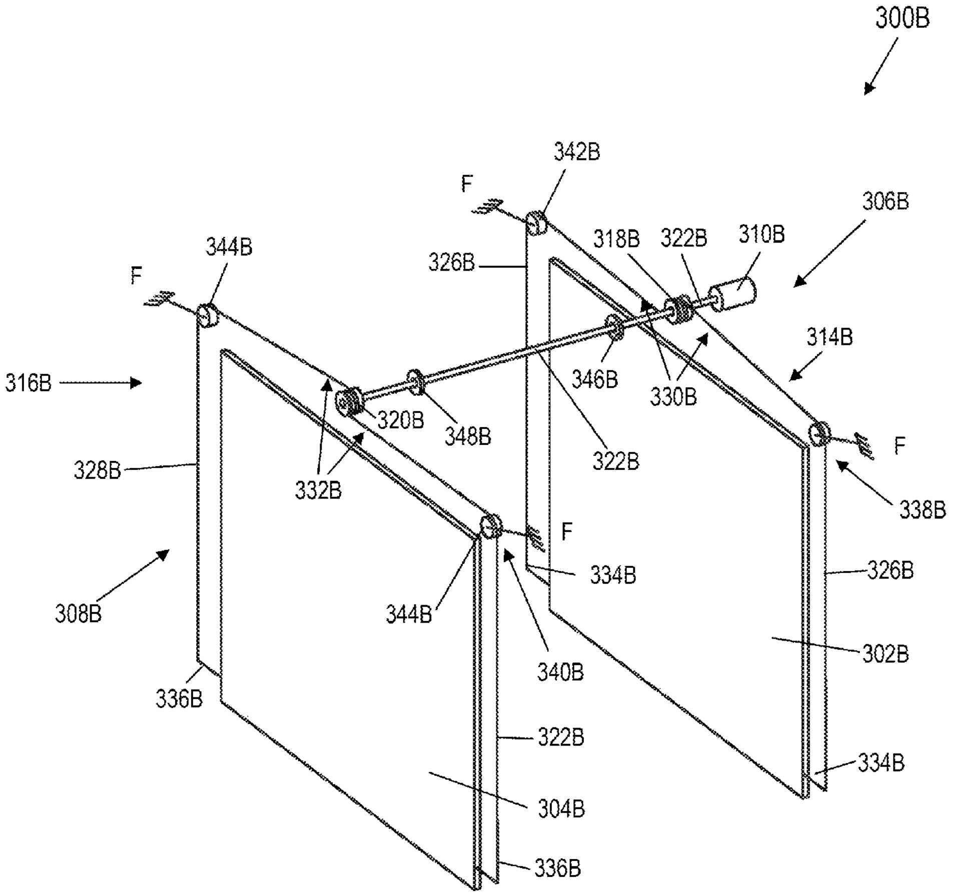

In FIG. 4B, two discrete drive systems are depicted, controlled by a single motor. In the depicted example, a sash 302B and a panel 304B are depicted. Each of the sash 302B and panel 304B are actuated by a dedicated drive system 314B, 316B, respectively, driven by a single motor 310B. As such, actuation systems 306B, 308B are substantially identical in configuration, although the motor 310B should be sized for the heavier of the two components (the sash 302B or the panel 304B), or the combined weight of both. Each drive system 314B, 316B includes a pulley 318B, 320B connected to the single motor shaft 322B. Clutches 346B, 348B are used to engage the pulleys 318B, 320B so as to engage the pulleys 318B, 320B. Although one pulley 318B, 320B is depicted, two pulleys may also be used. Cables 326B, 328B are connected at first ends 330B, 332B to the pulley 318B, 320B. At second ends 334B, 336B, the cables 326B, 328B are connected to a lower portion of the sash 302B or panel 304B, respectively. Central portions 338B, 340B of the cables 326B, 328B are routed about pulleys 342B, 344B so as to reduce friction. The pulleys 342B, 344B are generally fixed in position, for example, to the window unit frame F.

Figure 4C:
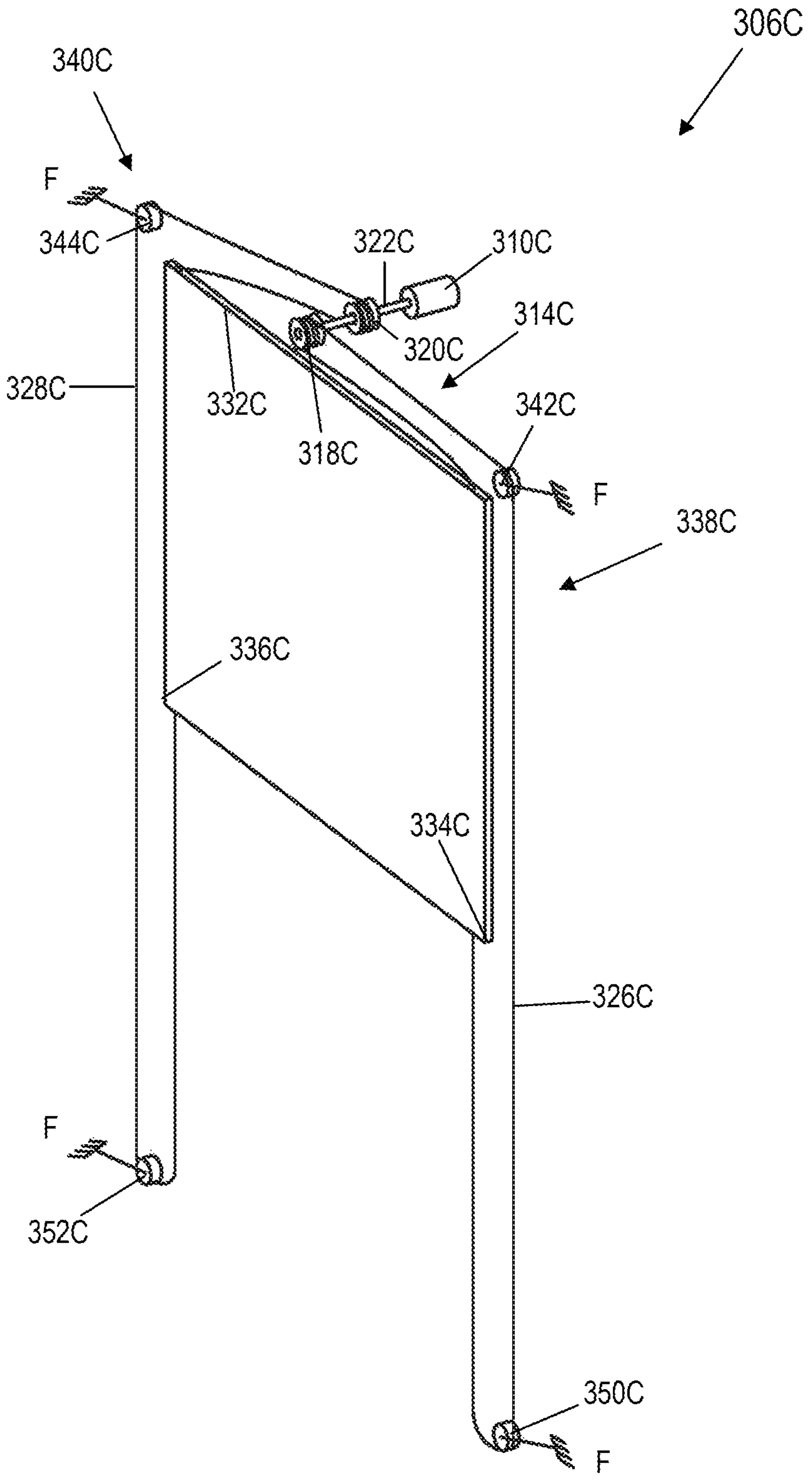

In FIG. 4C, a single actuation system 306C is depicted for a sash 302C, although a similar configuration may be used for a panel. Additionally, a single motor with pulleys and clutches, similar to that depicted in FIG. 4B may be utilized. The actuation system 306C includes a motor 310C, and a drive system 314C. The drive system 314C includes two chains 326C, 328C connected to a motor shaft 322C by a sprocket 318C, 320C. The chains 326C, 328C are connected at first ends 330C, 332C to an upper portion of the sash 302C. At second ends 334C, 336C, the chains 326C, 328C are connected to a lower portion of the sash 302C. Central portions 338C, 340C of the chains 326C, 328C are routed about sprockets 342C, 344C so as to reduce friction. Additional sprockets 350C, 352C can be disposed generally near the bottom of the window unit frame F so as to enable a full range of motion and to further reduce friction. The sprockets 342C, 344C, 350C, 352C are generally fixed in position, for example, to the window unit frame F.

Figure 4D:
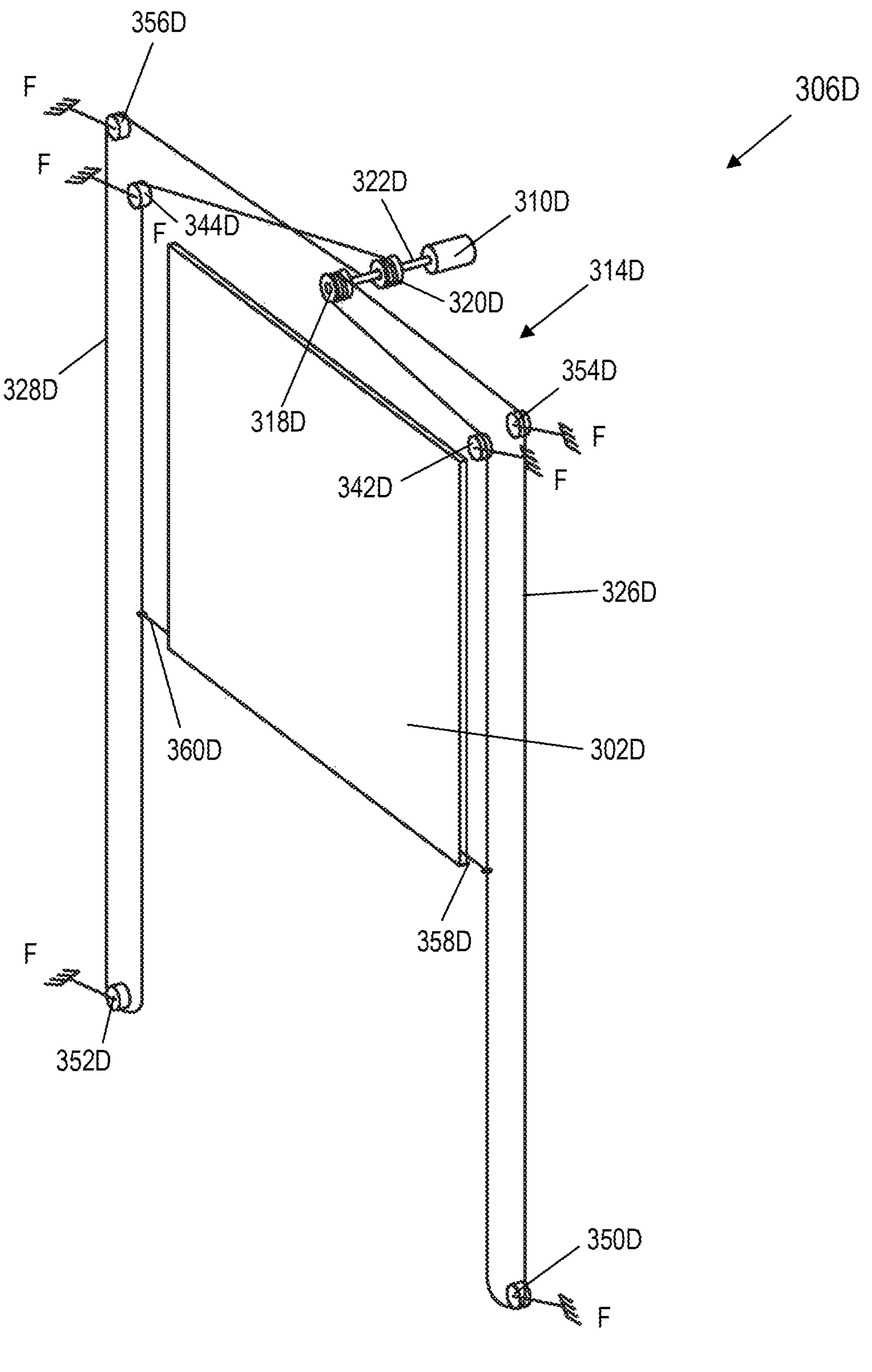

In FIG. 4D, a single actuation system 306D is depicted for a sash 302D, although a similar configuration may be used for a panel. Additionally, a single motor with pulleys and clutches, similar to that depicted in FIG. 4B may be utilized. The actuation system 306D includes a motor 310D, and a drive system 314D. The drive system 314D includes two chains 326D, 328D connected to a motor shaft 322D by a sprocket 318D, 320D. The chains 326D, 328D are continuous and are routed about sprockets 342D, 344D, 354D, 356D so as to reduce friction. Additional sprockets 350D, 352D can be disposed generally near the bottom of the window unit frame (not depicted) so as to enable a full range of motion and to further reduce friction. The sprockets 342D, 344D, 350D, 352D, 354D, 356D are generally fixed in position, for example, to the window unit frame F. Connectors 358D, 360D connect the sash 302D to the chains 326D, 328D, such that movement thereof moves the sash 302D.

Figure 4E:
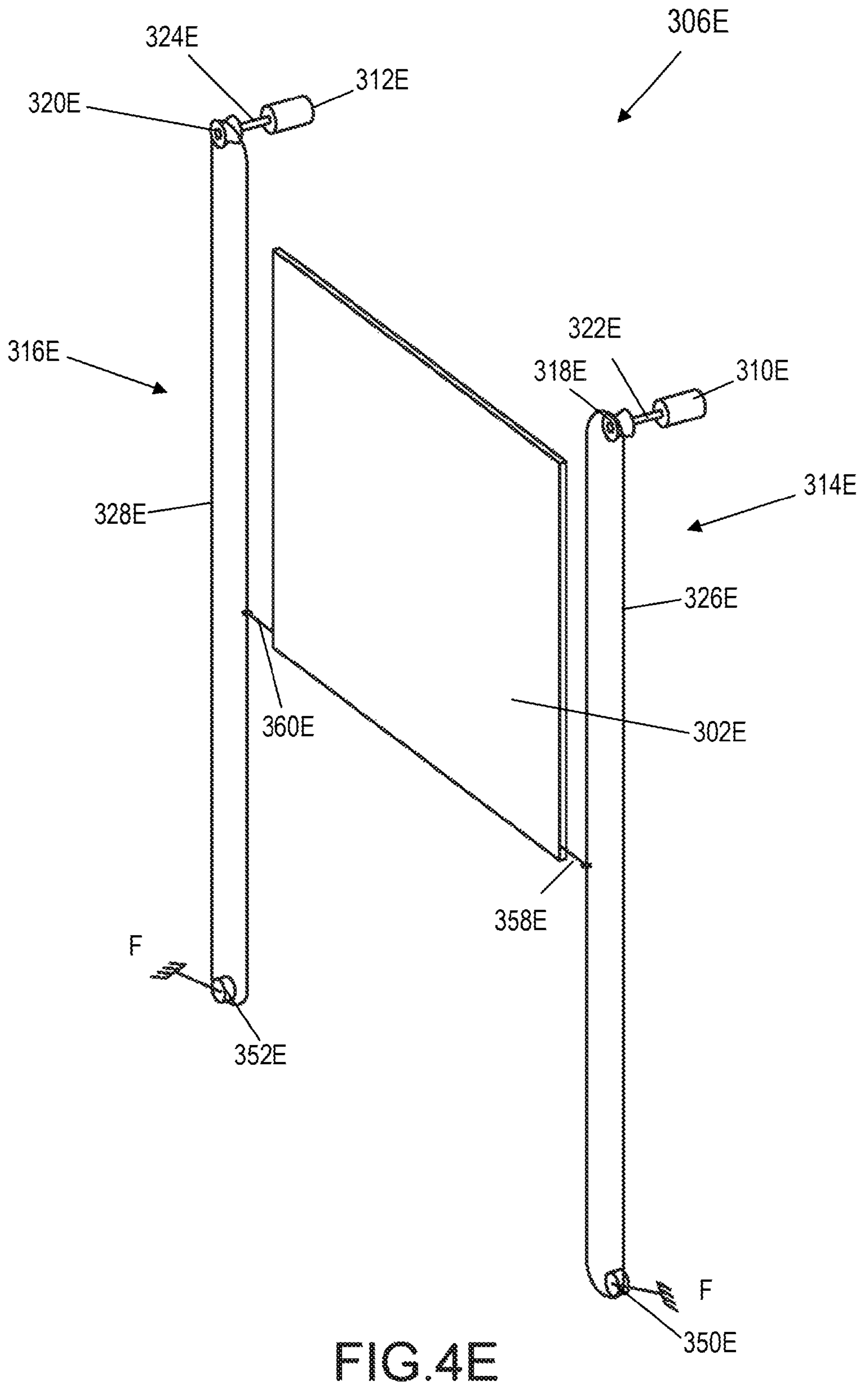

In FIG. 4E, a single actuation system 306E is depicted for a sash 302E, although a similar configuration may be used for a panel. The actuation system 306E includes two motor 310E, 312A and two drive systems 314E, 316E to drive a single sash 302E. The drive system 314E, 316E each include a chain 326E, 328E connected to a motor shaft 322E, 324E by a sprocket 318E, 320E. The chains 326E, 328E are continuous and are routed about sprockets 350E, 352E so as to reduce friction. The sprockets 350E, 352E are generally fixed in position, for example, to the window unit frame F. Connectors 358E, 360E connect the sash 302E to the chains 326E, 328E, such that movement thereof moves the sash 302E. Each motor 310E, 312E may be sized so as to be able to lift and lower the sash 302E alone, should the other motor 310E, 312E fail.

Figure 5:
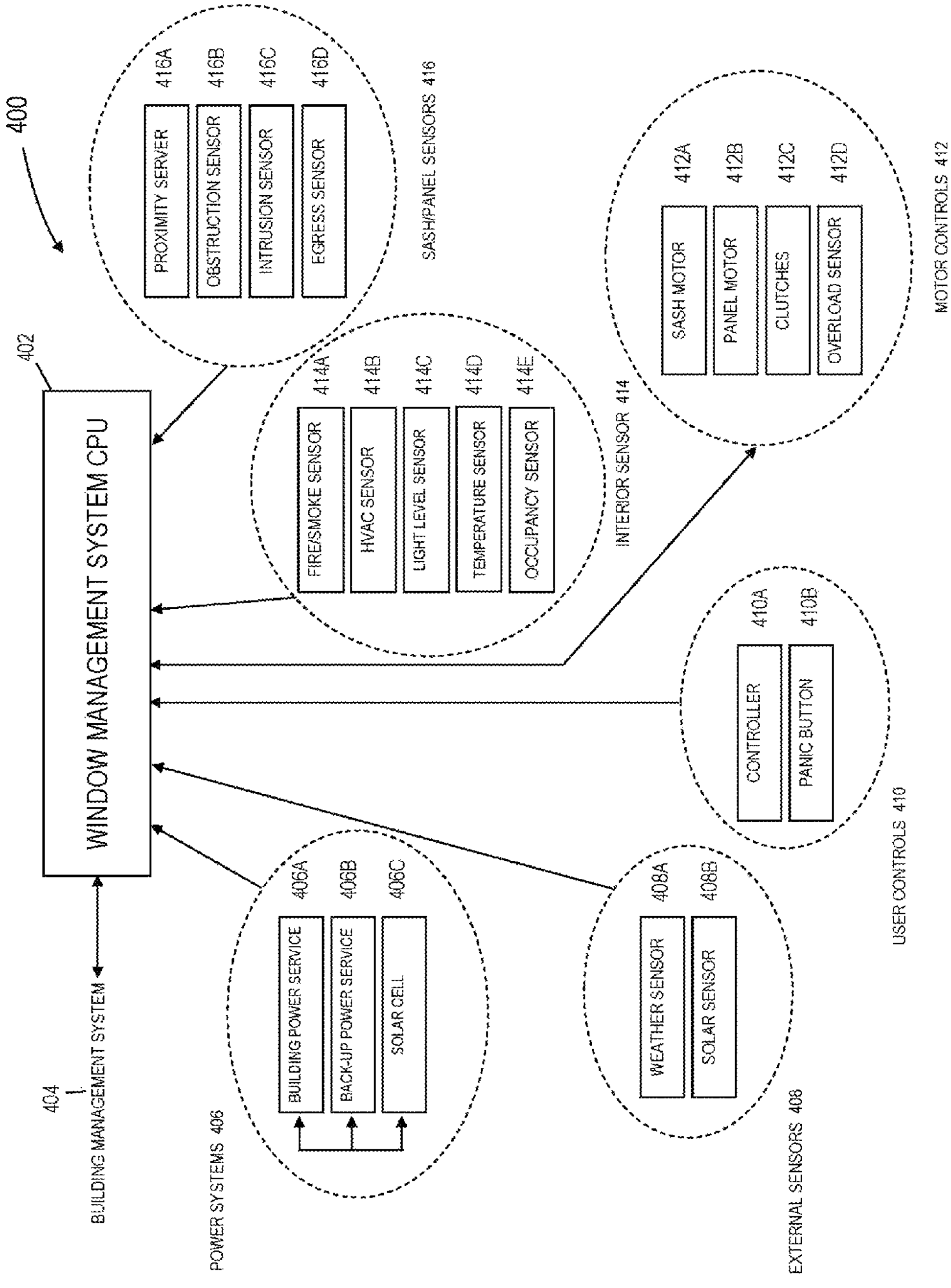
FIG. 5 depicts a schematic diagram of a window management system.

FIG. 5 depicts a schematic diagram of a window management system 400 (WMS). In general, the WMS 400 includes a WMS CPU 402 that receives inputs from sensors such as interior and exterior air temp, time, various weather conditions such as wind velocity, barometric pressure, rain sensors, anti-pinch features, etc. Certain of these sensors may be integrated with the window unit and/or window unit frame, if desired. The WMS CPU 402 has outputs to the drive motors and actuators that slide the sash and panel. The WMS CPU 402 takes these inputs and additional inputs (either from remote controls or manual switches), analyzes the inputs, and sends outputs to control the drive motors and other functions. The WMS CPU 402 also senses and controls the output of the solar cells and battery capacity, and switches the power to the motors and WMS CPU 402 from the battery, e.g., to a 120V AC grid. In examples, the 120V AC input is transformed to 12 DC when solar cell output is not sufficient. Thus, each window unit in a bank of window systems may be individually controlled with their own dedicated WMS CPU 402. In other examples, each window unit in a bank of windows (or a building of windows) may be connected to a single WMS CPU 402 to be controlled at a central location. WMS CPUs controlling single or multiple windows may function as a connection point to tie the WMS 400 into a building management system 404. Each window system unit may include inputs, plugs, power connection elements, etc., that enable quick connection to control wiring, building power, etc. These plugs and connections may be disposed on an exterior of the window frame or within the frame itself (to be accessed by removal of an interior or exterior panel). In other examples, the WMS CPU 402 may actuate panels based on battery power available. That is, if the battery power is low, the system may move an outer solar panel partially or completely so as to charge the battery.

The window systems described herein may be incorporated into so-called "green" or "zero energy" buildings and may thus provide LEED credits to building owners and/or tenants. Each individual window unit may be controlled remotely or at the unit itself. If controlled at the window itself, a panel of the window system may include a controller in the form of buttons, switches, touchscreen(s) including a graphic user interface, or other such systems. A single controller disposed on a single window system may be used to control multiple window systems. The controller may communicate with the motors, actuators, sensors, and other elements in other window systems via wired or wireless connections. Sensor can include outdoor or indoor air temperature sensors, rain sensor, or other sensors.

With these general principles in mind, a specific example of a WMS 400 is further described in FIG. 5. In addition to being connected to the building management system 404, the WMS CPU 402 can be connected to a number of power systems 406, exterior sensors 408, user controls 410, motor controls 412, interior sensors 414, and sash/panel sensors 416. The power systems 406 include either or both of building power service 406A, backup or battery power service 406B, and one or more solar cells 406C. Battery power service 406B can be integrated with each window unit or configured to serve a number of units and may be particularly desirable for operation should building power service 406A fail. Solar cells 406C may be mounted on the exterior side of the frame and/or to the exterior panels and supply power to the battery power service 406B or directly to the WMS CPU 402. Additionally, solar cells 406C may be integrated into the panel so as to generate additional solar power when the panel is in the closed position. The solar cells 406C may be remotely mounted if necessary and it may be sized to power an individual window unit. Additionally, a solar cell 406C may be sized and configured to provide electrical power for the building, for example, by delivering power back to the building power service 406A. Excess power generated may be delivered to an electrical grid.

Exterior sensors 408 may include weather sensors 408A and solar sensors 408B. Weather sensors 408A contemplate outdoor air temperature sensors, rain sensors, wind sensors, sensors that measure barometric pressures, and other sensors. Information derived from these sensors can be used to optimize functionality of the WMS 400. For example, activation of a rain sensor and a wind sensor may cause the WMS CPU 402 to close all sashes on a side of a building that may be susceptible to rain ingress. A desirable reading from the solar sensor 408B may cause the WMS CPU 402 to ensure movable solar panels are in place to receive an optimum amount of solar power. Other configurations and functionalities are contemplated.

User controls 410 contemplate any device that be activated by a user (either remotely or local to a window unit) so as to control come aspect of window operation. For example, a controller 410A may be a simple open/close switch to allow a user to operate the sash and or panel of the window. The controller 410A may also allow direct interaction with one or more functions of the window management system 400, via the WMS CPU 402. Indeed, each window may include a controller (e.g., a GUI) that allows a user to control any and all functions of the WMS 400, or a subset thereof. A panic button 410B may be incorporated such that, when activated, both the sash and the panel open to allow emergency egress via the window unit. An alarm may also be sent, e.g., to the building management system 404. Other configurations and functionalities are contemplated.

Motor controls 412 include actuators to actuate sash motor(s) 412A, panel motor(s) 412B, clutches 412C, and can also include overload sensor(s) 412D to detect potential problems associated with the motors. The operation of the motor controls would be apparent to a person of skill in the art. Interior sensors 414 include those that can sense or otherwise detect a condition in an interior of a building, either proximate a particular window unit, or elsewhere. These sensors include fire/smoke sensors 414A, HVAC sensors 414B, light level sensors 414C, temperature sensors 414D, and occupancy sensors 414E. Output from these sensors can trigger the WMS CPU 402 to take certain actions. For example, the WMS CPU 402 may open the windows and open the panels when the HVAC system is in a 100% outside air mode (to take advantage of free cooling available based on building load and outside temperature). By simply allowing air to escape the building via the open windows, power exhaust fans on an HVAC unit need not be operated to draw air through HVAC return ductwork, further saving on energy costs. In another embodiment, the sash may be kept closed and a natural or powered ventilator could be incorporated into the interior and exterior panels of the window system. Panels may be closed when occupancy sensors 414E do not detect the presence of room occupants, which may save on heating costs, if the panels are insulated and cover the glass sash. Other functions based on outputs of certain interior sensors 414 are contemplated.

Sash/panel sensors 416 may detect conditions directly related to the sash or panel. For example, a proximity sensor 416A may detect the proximity of, e.g., a user's arm, within the window opening and not operate the sash and/or panel even if instructed to do so by the WMS CPU 402, for the user's safety. An obstruction sensor 416B may detect an obstruction blocking movement of the sash or panel (e.g., a branch that may have fallen into the window) and prevent further movement (or reverse movement) of the panel so as not to cause damage thereto. An intrusion sensor 416C may detect a force applied to, e.g., an exterior of the sash, which would signal the WMS CPU 402 to active closure of the panel to further secure the building. An egress sensor 416D may detect a similar force applied to an interior of the sash and automatically open the sash and/or panel. Other sensors and functionalities are contemplated.

Figure 6:
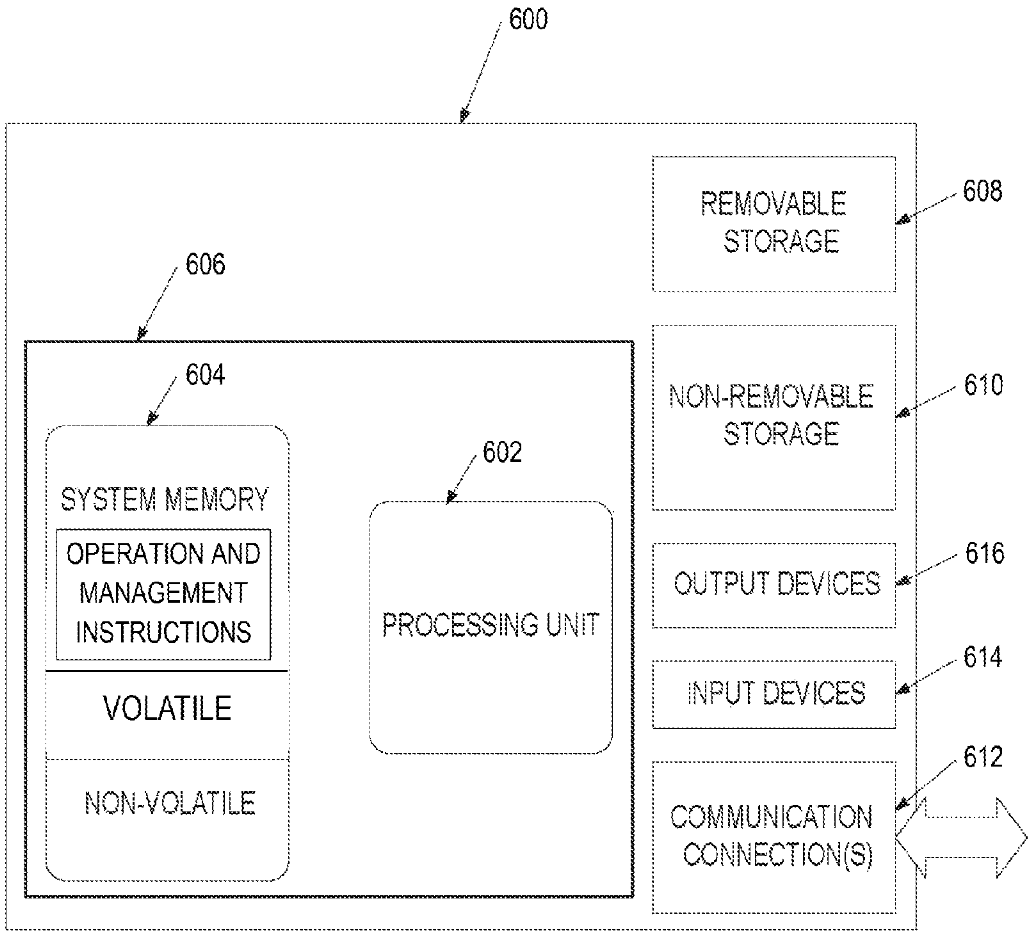
FIG. 6 illustrates one example of a suitable operating environment in which one or more of the present examples may be implemented.

FIG. 6 illustrates one example of a suitable operating environment 600 in which one or more of the present examples may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, smartphones, tablets, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, instructions to perform the device window operation methods described herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as touch screens, keyboard, mouse, pen, voice input, etc. and/or output device(s) 616 such as a display, speakers, printer, etc. Also included in the environment may be one or more communication connections, 612, such as LAN, WAN, point to point, Bluetooth, RF, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

In some examples, the components described herein comprise such modules or instructions executable by computer system 600 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 600 is part of a network that stores data in remote storage media for use by the computer system 600.

Figure 7:
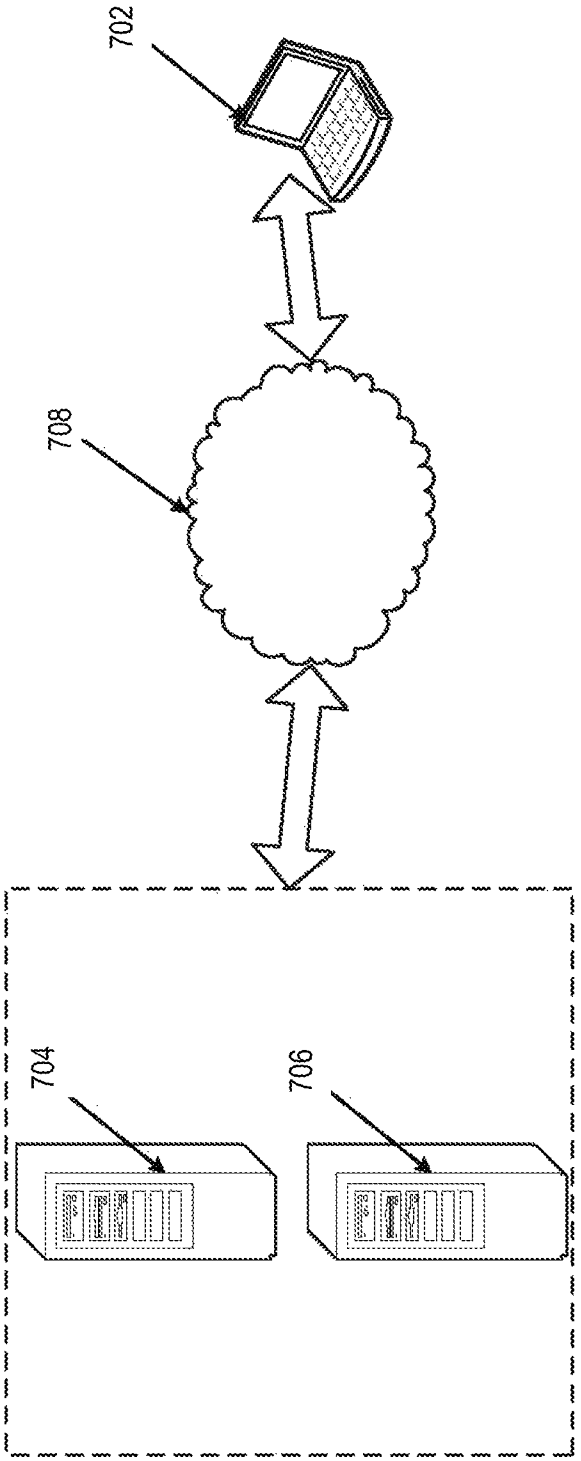
FIG. 7 is an embodiment of a network in which the various systems and methods disclosed herein may operate.

FIG. 7 is an embodiment of a network 700 in which the various systems and methods disclosed herein may operate. In examples, portable device, such as client device 702, may communicate with one or more servers, such as servers 704 and 706, via a network 708. In examples, a client device may be a laptop, a tablet, a personal computer, a smart phone, a PDA, a netbook, or any other type of computing device, such as the computing device in FIG. 6. In examples, servers 704 and 706 may be any type of computing device, such as the computing device illustrated in FIG. 6. Network 708 may be any type of network capable of facilitating communications between the client device and one or more servers 704 and 706. Examples of such networks include, but are not limited to, LANs, WANs, cellular networks, and/or the Internet.

In examples, the various systems and methods disclosed herein may be performed by one or more server devices. For example, in one embodiment, a single server, such as server 704 may be employed to perform the systems and methods disclosed herein. Portable device 702 may interact with server 704 via network 708 in send testing results from the device being tested for analysis or storage. In further examples, the portable device 702 may also perform functionality disclosed herein, such as by collecting and analyzing testing data.

In alternate examples, the methods and systems disclosed herein may be performed using a distributed computing network, or a cloud network. In such examples, the methods and systems disclosed herein may be performed by two or more servers, such as servers 704 and 706. Although a particular network embodiment is disclosed herein, one of skill in the art will appreciate that the systems and methods disclosed herein may be performed using other types of networks and/or network configurations.

The examples described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure described some examples of the present technology with reference to the accompanying drawings, in which only some of the possible examples were shown. Other aspects may, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope and spirit of the present technology. Therefore, the specific structure, acts, or media are disclosed only as illustrative examples. The scope of the technology is defined by the following claims and any equivalents therein.

What is claimed is:

1. A window unit comprising:

a frame comprising two opposite jambs, a head, and a sill;

a sash slidably disposed in the frame, wherein the sash comprises at least one pane of glass;

a panel slidably disposed in the frame independently of the sash, wherein the panel is disposed parallel to the sash;

a receiver fixed at a first end of the frame adjacent the sill, wherein when the sash is in a first position, the sash is disposed substantially within the receiver, and wherein when the sash is in a second position, the sash is disposed substantially outside the receiver;

a motor fixed relative to the frame;

a drive system connecting the motor to at least one of the sash and the panel, wherein the drive system comprises a pulley and at least one of a chain and a cable, wherein the at least one of the chain and the cable comprises a first end, a second end, and a central portion, wherein the first end is connected to the sash proximate an upper portion of the sash, and wherein the second end is connected to the sash proximate a lower portion of the sash, and wherein the central portion is disposed about the pulley; and a control input connected to the motor, wherein the control input is configured to receive a signal from at least one of a controller, a sensor, and a building management system.

2. The window unit of claim 1, further comprising a clutch and wherein the drive system comprises a sash drive system, wherein the motor, clutch, and the sash drive system are configured to move the sash between the first position and the second position.

3. The window unit of claim 2, wherein the drive system comprises a panel drive system, wherein the motor, clutch, and the panel drive system are configured to move the panel.

4. The window unit of claim 1, further comprising the controller mounted to the window unit, wherein the window unit comprises an output connected to the control input.

5. The window unit of claim 1, wherein the control unit is connected to at least one of a building power source, a battery, and a solar panel.

6. The window unit of claim 5, further comprising the solar panel, wherein the solar panel is disposed on an exterior of the frame.

7. The window unit of claim 6, wherein the frame at least partially defines the receiver.

8. The window unit of claim 5, wherein the panel is the solar panel.

9. The window unit of claim 1, wherein the panel comprises at least one of a solar panel, a security panel, a screen, a mesh, a louver, and a reflective panel.

10. The window unit of claim 1, wherein the motor is disposed in a motor compartment disposed at a second end of the frame, opposite the first end of the frame.

11. The window unit of claim 1, wherein the motor is disposed in the receiver.

12. The window unit of claim 1, wherein the sash is biased into the first position.

13. The window unit of claim 1 further comprising an exterior panel disposed adjacent the first end.

14. The window unit of claim 13 further comprising an interior panel opposite the exterior panel.

15. The window unit of claim 14, wherein the receiver is defined at least partially by the exterior panel, the interior panel, and the frame.

16. The window unit of claim 1, wherein when the panel is in a first position, the panel is disposed substantially within the receiver, and wherein when the panel is in a second position, the panel is disposed substantially outside the receiver.

17. The window unit of claim 16, wherein the panel is biased into the first position.

18. The window unit of claim 16, wherein the sash first position is approximately equal to the panel first position within the frame, and the sash second position is approximately equal to the panel second position within the frame.

* * * * *